3,595,868
PERBROMOCYANOPYRIDINES AND VAPOR PHASE BROMINATION PROCESS FOR PREPARING THE SAME

Sven H. Ruetman, Walnut Creek, Calif., assignor to The Dow Chemical Company, Midland, Mich.
No Drawing. Filed July 18, 1968, Ser. No. 745,711
Int. Cl. C07d 31/46
U.S. Cl. 260—294.9          11 Claims

ABSTRACT OF THE DISCLOSURE

Perbromo derivatives of mono- and dicyanopyridines are prepared by contacting vapors of a suitable cyanopyridine and excess bromine at a temperature of from about 500° to about 700° C. The resulting bromination reaction goes forward in a rapid and efficient manner with little carbonization or tar formation. The perbromocyanopyridines are useful as pesticides, particularly for the control of insects and fungi.

SUMMARY OF THE INVENTION

The novel compounds of the present invention are perbromocyanopyridines of the formula

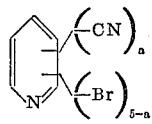

wherein $a$ is an integer having a value of 1 or 2. The term "perbromocyanopyridines" is employed in the present specification and claims to designate those perbrominated mono- and dicyanopyridine compounds corresponding to the above formula.

The novel perbromocyanopyridines are white to light brown amorphous or crystalline solids which are very slightly soluble in water and are of varying degrees of solubility in common organic solvents such as acetone, benzene, and alcohols. They are useful as pesticides for the control of various organisms and are particularly useful for the control of insects as Aedes aegypti and of many bacterial and fungal pests as *Bacillus subtilis, Mycobacterium phlei, Candila pelliculosa, Pullularia pullulans, Cephaloascus fragans, Ceratocystis ips, Trichoderma* spp., *Aspergillus terreus, Rhizopus nigricans* and *Plasmophora viticola*.

Representative perbromocyanopyridines of the present invention include 3,4,5,6-tetrabromopicolinonitrile, 2,4,5,6-tetrabromonicotinonitrile, 2,3,5,6-tetrabromoisonicotinonitrile 2,6-dicyanotribromopyridine, 2,4-cyanotribromopyridine, 2,5-dicyanotribromopyridine, 3,5-dicyanotribromopyridine, 2,3-dicyanotribromopyridine and 3,4-dicyanotribromopyridine.

The compounds of the present invention can be prepared by a novel vapor phase bromination method which comprises contacting cyanopyridine vapor with excess bromine vapor at a temperature of from about 500° to about 700° C. The term "excess bromine" is employed herein to mean bromine employed in an amount of at least 10 molar proportions of bromine per molar proportion of the cyanopyridine reactant. The desired perbromination reaction takes place rapidly and efficiently and is accompanied by little or no carbonization or formation of tarry by-products, when the cyanopyridine and excess bromine vapors are contacted and mixed at a temperature within the above defined range. It is an advantage of the process of the invention that the perbromocyanopyridine products produced thereby are obtained in excellent yields with little or no carbonization and formation of tars and other undesirable by-products.

The term "cyanopyridine," as employed herein, means a monocyanopyridine or dicyanopyridine compound, a mono-, di- or tribromomonocyanopyridine compound or mono- or dibromodicyanopyridine compound. The terms "monocyanopyridine" and "dicyanopyridine" are employed herein to designate those cyanopyridines which have no substituents other than the indicated cyano group or groups. The term "partially brominated pyridines" is employed to designate those cyanopyridines which contain one or more bromine atom. Such compounds can be employed as starting materials to form the perbromocyanopyridine products. Representative cyanopyridine reactants include 2-cyanopyridine, 3-cyanopyridine, 4-cyanopyridine, 2-bromo-4-cyanopyridine, 2-cyano-4,6-dibromopyridine, 4-cyano-2,3,6-tribromopyridine, 2,6-dicyanopyridine, 2,4-dicyanopyridine, 2,5-dicyanopyridine, 4-bromo-2,5-dicyanopyridine, 3,5-dicyanopyridine, 2-bromo-4,6-dicyanopyridine, 2,3-dicyanopyridine, 2,3-dibromo-4,6-dicyanopyridine, 3,5-dibromo-2,6-dicyanopyridine and 3,4-dicyanopyridine. When the cyanopyridine reactant is partially brominated, any bromine atoms present can be regarded as neutral substituents on the starting compound. Any such partially brominated cyanopyridine compounds of this character as are formed during the present process can be separated from the reaction mixture and employed as starting materials by conventional recycling procedures.

The reaction proceeds with the evolution of heat and hydrogen bromide of reaction when the cyanopyridine vapor and the excess bromine vapor are mixed and the mixture heated at a temperature within the reaction temperature range. The exact order of mixing the reactant vapors and heating is not critical, so long as the mixture of vapors is heated at a temperature of from about 500° to about 700° C. Thus the reactants can be mixed, then vaporized and then heated, or the separate reactants can be heated to a temperature within the reaction temperature zone and then mixed together. The mixture is maintained at a temperature within the reaction temperature range for from a few seconds to a few minutes, after which it is cooled by conventional procedures such as mixing the reaction mixture with a quench liquid, preferably an anhydrous inert organic solvent. The perbromocyanopyridine product can be separated by known procedures such as distillation or evaporation to remove unreacted bromine, hydrogen bromide of reaction and the solvent. The product can be purified by known procedures such as distillation under reduced pressure or evaporation.

The reaction takes place rapidly and provides good yields of the desired perbromocyanopyridine products. Although the reaction period, that is, the time during which the temperature of the reaction mixture is within the reaction temperature zone, is not critical, the reactants should not be permitted to remain in contact with one another for a prolonged period once they have been heated to a temperature above 500° C. The reaction period generally does not exceed 5 to 6 minutes. The exact reaction period to be employed in a particular instance depends, in part, upon the particular reaction temperature, the cyanopyridine reactant and the excess of bromine employed. In general, with a given cyanopyridine starting material and a given excess of bromine, longer reaction periods are required when lower reaction temperatures are employed. Preferably, the mixture of reactant vapors is heated at a temperature of from about 550° C. to about 675° C. for a reaction period of from about 15 to about 100 second.

The proportions of the reactants to be employed are critical to the preparation of the perbromocyanopyridines in good yields, and it is critical and essential that excess bromine, that is, at least about 10 molar proportions of bromine per molar proportion of cyanopyridine, be employed. Preferably the excess of bromine is from about 20 to 60 moles of bromine per mole of cyanopyridine, and good yields of perbromocyanopyridines are also obtained with a still larger bromine excess, such as from 60 to 100 or more moles of bromine per mole of cyanopyridine.

The mixture of reactant vapors is preferably obtained by dispersing the cyanopyridine compound in liquid bromine and then heating the resulting dispersion. The heating is conveniently accomplished by passing the dispersion through an evaporator maintained at a temperature above the boiling point of the cyanopyridine. This procedure ensures that the reactants are thoroughly mixed when they are heated to the reaction temperature. Alternatively, the cyanopyridine can be dispersed in an inert solvent and this dispersion can then be vaporized and mixed with excess bromine. The inert solvent is a solvent which is not deleteriously reactive with the cyanopyridine, and which is not susceptible to carbonization or tar formation at temperatures within the reaction temperature range. Bromoform or molten carbon tetrabromide are suitable inert solvents. The term "dispersion" is here employed to include both true solutions as well as those wherein the cyanopyridine reactant is present as a separate phase in finely divided form. In another alternative, the cyanopyridine reactant can be vaporized in the absence of a solvent, with the resulting hot vapors being then admixed with the excess bromine vapors. The heated mixture of bromine vapor, cyanopyridine vapor and any inert solvent vapor employed can then be introduced into a reaction zone where the gaseous mixture is rapidly brought to the desired reaction temperature in a range of from at least 500° to 700° C.

The mixture of reactant vapors is conveniently heated at a temperature within the reaction temperature range by passing the mixture through a reactor maintained at such temperature. Any suitable reactor can be employed, and since the reaction is exothermic, heat is applied only as required to maintain the reaction mixture at the desired temperature. Accordingly, the reactor should be provided with a heating coil or other heating means to bring the entering feed gases rapidly to reaction temperature and to maintain said temperature as the gaseous mixture moves through the reactor. The inlets, outlets and interior surfaces of the reactor should be of materials which are resistant to corrosion by bromine and hydrogen bromide at high temperatures. Thus. for example, such surfaces may be lined with nickel, carbon, silica or glass. In practice, it has been found that thermally resistant, high-silica glass such as Vycor brand is satisfactory for small reactors. In large scale apparatus it is convenient to employ a shell of nickel lined with fused silica or a suitable refractory material such as carbon. Conventional accessories, such as flowmeters on the inputs and condensers, cooling tubes or a quench system for the exit gases cam also be employed.

Operating pressures to be maintained during the reaction are not critical and may vary from subatmospheric to somewhat superatmospheric. Atmospheric pressures are satisfactory and preferred.

In carrying out the method of the invention for the preparation of the perbromocyanopyridine compounds, the cyanopyridine vapor is mixed with excess bromine vapor in any order or fashion and the mixture is heated at a temperature within the reaction temperature zone. In a convenient procedure, a dispersion of the cyanopyridine starting compound in excess bromine is vaporized by passing the solution through a suitable evaporator maintained at a temperature which is high enough to effect vaporization of the cyanopyridine. In the preferred procedure the mixture of vapors is heated to a temperature from about 25° to 150° C. above the boiling point of the cyanopyridine. Any suitable vaporizing device can be employed as an evaporator, and an inclined tube jacketed with heating coils or a wiped film evaporator have been found to be convenient. For efficient operation it is desirable that the feed rate and/or temperature of the evaporator be maintained so as to completely vaporize the cyanopyridine reactant and maintain it in the vaporized state. Incomplete vaporization results in decreased yields of the desired perbrominated products.

The hot vapors from the evaporator are then passed into a reactor to be heated to reaction temperature. To ensure thorough mixing of the reactants, the preferred practice is to inject the vaporous reaction mixture into the reactor through a mixing nozzle having a relatively small orifice so that the reactants enter the reactor in a condition of turbulent flow. Alternatively, when the reactants are vaporized separately, the cyanopyridine reactant vapors and those of any inert solvent employed, as well as the bromine, can be introduced into the reactor by separate orifices adjusted so that the bromine is jetted into the incoming stream of the cyanopyridine vapors.

In the reactor, the mixture of gaseous reactants is rapidly brought to the reaction temperature of from about 500° to 700° C.

The vapors passing from the reactor are cooled or quenched, conveniently by bubbling the vapors into an anhydrous organic solvent such as chloroform or carbon tetrachloride. Hydrolysis of the perbromocyanopyridine products to the corresponding amides can occur in the presence of relatively strong aqueous acid, hence the use of an anhydrous organic solvent as a quench liquid is preferred. However, water can also be used as the receiving liquid provided high local concentrations of hydrogen bromide are not allowed to build up therein to any appreciable extent. When an ogranic solvent is used to quench the reactor effluent, the excess unreacted bromine and hydrogen bromide of reaction can be distilled off and recovered, and the bromine can be dried and recycled, if desired. The perbromocyanopyridine product is conveniently obtained by distillation to remove the organic solvent. The product can then be purified by such procedures as distillation, preferably under reduced pressure. When water is employed to quench the reaction mixture, the perbromocyanopyridine product is obtained as a precipitate and can be separated by filtration or decantation and purified by distillation or other known methods. Any partially brominated cyanopyridine can be recovered as such or recycled and employed as starting materials. The perbromocyanopyridine, product compounds, whether recovered by distillation, by precipitation and filtration or by other known method, can be further purified by recrystallization from a solvent or by other means known to the skilled in the art.

DESCRIPTION OF THE PREFERRED EMBODIMENTS

The following examples illustrate the invention but are not to be construed as limiting.

Example 1

26 grams (0.25 mole) of 2-cyanopyridine are dissolved in 1767 grams (11.06 moles) of liquid bromine. The solution is forced by nitrogen at a pressure of 5 pounds per square inch (gauge) from a feed reservoir through a flowmeter into a preheated evaporator at a rate of 3.6 grams of solution per minute. The solution is vaporized in the evaporator and the vapors exit from the evaporator at a temperature of 340° C. The resulting mixture of vapors is passed through a nozzle having an orifice 0.25 centimeter in diameter into a tubular high silica glass (Vycor) reactor having a volume of 1.35 liters and a length to diameter ratio of 5 to 1. In the reactor the mixture of vapors is heated at a temperature of 635° C. The mixture of vapors is passed through the reactor at a rate such that the residence time (time any portion of gas remains in the reactor) is 48 seconds. The product vapors exiting from the reactor are passed into anhydrous carbon tetrachloride maintained at room temperature and bubbled therethrough to quench the reaction mixture and collect the product. At irregular intervals, whenever solid appears in a portion of quench liquid, the quench liquid is replaced with a portion of fresh anhydrous carbon tetrachloride. The process is carried out continuously for 60 minutes. The portions of quench liquid are combined and distilled under anhydrous conditions to remove carbon tetrachloride, hydrogen bromide and excess bromine. The yellow solid residue is held in a vacuum over flaked sodium hydroxide for 16 hours. The 2-cyano-3,4,5,6-tetrabromopyridine product is found by elemental analysis to have carbon, nitrogen and bromine contents of 17.19, 6.41 and 76.04 percent, respectively, as against theoretical values of 17.17, 6.68 and 76.16 percent, respectively, calculated for the named structure. Vapor phase chromatographic analysis shows the product to be of high purity and the yield, based on the quantity of 2-cyanopyridine employed, is calculated to be almost quantitative. This product is very slightly soluble in water and has low to moderate solubility in acetone, benzene and carbon tetrachloride. The product has a melting point of approximately 213°–214° C. and a boiling point of about 384° C. under atmospheric pressure. The structure of the product is confirmed by mass spectrographic and infrared spectroscopic analysis.

In similar operations, 2-cyano-3,4,5,6-tetrabromopyridine is similarly prepared by employing one of 2-cyano-4,6-dibromopyridine, 2-cyano-3,4,5,-tribromopyridine or 6-bromo-2-cyanopyridine as a starting material in lieu of the 2-cyanopyridine.

Example 2

Using the apparatus and essentially the same methods as described in Example 1, 3-cyano-2,4,5,6-tetrabromopyridine is prepared. In such operation, 26 grams (0.25 mole) of 3-cyanopyridine is dissolved in 1767 grams (11.06 moles) of bromine. The solution is vaporized at a temperature of 320° C. and the resulting mixture of vapors is heated at a temperature of 600° C. by passing through a reactor. The estimated residence time at which the mixture is heated in the reactor is 56 seconds. The heated mixture is then quenched and collected in anhydrous chloroform. The chloroform quench liquid is distilled and the solid residue is then recrystallized twice from carbon tetrachloride. The 3-cyano-2,4,5,6-tetrabromopyridine is obtained as a white powder which melts at 226°–227° C. and boils at about 376° C. under atmospheric pressure. Elemental analysis discloses the product to have carbon, nitrogen and bromine contents of 17.27, 6.60 and 76.26 percent, respectively, as compared with theoretical contents of 17.17, 6.68 and 76.16 percent, respectively, calculated for the named structure. The structure of the product is confirmed by mass spectrographic and infrared spectroscopic analysis.

Example 3

Using the apparatus and the same general procedure as set forth in the preceding examples, 4-cyano-2,3,5,6-tetrabromopyridine is prepared. A solution of 26 grams (0.25 mole) of 4-cyanopyridine in 1767 grams (11.06 moles) of bromine is vaporized at 350° C. and the mixture of vapors is heated in the reactor at a temperature of 600° C. for a residence time of 38 seconds. The product is collected and the reaction mixture quenched by passing the vapors from the reactor into anhydrous chloroform. The quench liquid is distilled to remove the chloroform, hydrogen bromide of reaction and unreacted bromine. The residue is recrystallized twice from carbon tetrachloride. The 4-cyano-2,3,5,6-tetrabromopyridine product is obtained as a white solid melting at 202°–203° C. and boiling at 372° C. under atmospheric pressure. Elemental analysis discloses the product to contain carbon, nitrogen and bromine in amounts of 17.18, 6.50 and 76.22 percent, respectively, as compared to theoretical contents of 17.17, 6.68 and 76.16 percent, respectively, calculated for the named structure. The structure of the product is confirmed by mass spectrographic and infrared spectroscopic methods of analysis.

Example 4

Using the apparatus and the same general method as described in the foregoing examples 2,6-dicyano-3,4,5-tribromopyridine is prepared. In such operations 14 grams (0.108 mole) of 2,6-dicyanopyridine is dispersed in 693 grams (4.336 moles) of bromine, and the mixture is evaporated at a temperature of 375° C. The resulting mixture of vapor is then heated in the reactor at a temperature of 640° C. for a residence time of approximately 43 seconds. The product is collected and the reaction mixture quenched by passing the mixture of vapors into carbon tetrachloride. The quench liquid mixture is distilled and the residue is recrystallized once from glyme (dimethyl ether of ethylene glycol) and then once from benzene. The 2,6-dicyano-3,4,5-tribromopyridine is obtained as a white powdery solid melting at 272°–274° C. Elemental analysis discloses the product to have carbon, nitrogen and bromine contents of 23.17, 11.29 and 65.28 percent, respectively, as compared to the theoretical values of 22.98, 11.49 and 65.53 percent, respectively, calculated for the named structure. The structure of the product is confirmed by mass spectrographic and infrared spectroscopic analysis.

In substantially the same procedure as described above the following compounds are prepared:
2,4-dicyano-3,5,6-tribromopyridine by the reaction of 2,4-dicyanopyridine vapor with excess bromine vapor.
2,5-dicyano-3,4,6-tribromopyridine by the reaction of 2,5-dicyanopyridine vapor with excess bromine vapor.
3,5-dicyano-2,4,6-tribromopyridine by the reaction of 3,5-dicyanopyridine vapor with excess bromine vapor.
2,3-dicyano-4,5,6-tribromopyridine by the reaction of 2,3-dicyanopyridine vapor with excess bromine vapor.
3,4-dicyano-2,5,6-tribromopyridine by the reaction of 3,4-dicyanopyridine vapor with excess bromine vapor.

The perbromocyanopyridines of the present invention are useful as pesticides to be employed for the control of various pests, and in particular for the control of bacterial, fungal or insect pests.

In such applications the pest to be controlled is contacted with a pesticidal amount of one or more perbromocyanopyridine of the invention. For control of bacterial and fungal pests, the organism is contacted with a pesticidal amount which is also an antimicrobial amount of the compound. Good antimicrobial results are observed when microbial organisms are contacted with compositions containing from about 10 or less to about 5000 or more parts by weight of perbromocyanopyridine per million parts by weight of ultimate composition. For control of insect pests, a pesticidal amount which is also an insecticidal amount is employed.

For such uses, the compounds can be employed in an unmodified form or dispersed on a finely divided solid and employed as dusts. Such mixtures can also be dispersed in water with or without the aid of a surface-active agent and the resulting aqueous suspensions employed as drenches or sprays. In other procedures, the products are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

In representative operations, complete control and inhibition of the growth of *Bacillus subtilis* is obtained when one of 3-cyano-2,4,5,6-tetrabromopyridine or 2,6-dicyano-3,4,5-tribromopyridine is separately dispersed in nutrient agar at a concentration of 25 parts by weight of perbromocyanopyridine compound per million parts by weight of ultimate composition, and the agar is then inoculated with viable *Bacillus subtilis* organisms and incubated under conditions conducive to bacterial growth. In similar operations complete inhibition and control of the growth of Candida pelliculosa and Aspergillus terreus is obtained when one of 2-cyano-3,4,5,6-tetrabromopyridine or 2,6-dicyano-3,4,5-tribromopyridine is separately dispersed in nutrient agar at a concentration of 500 parts per million, and the agar is inoculated with the named organisms and incubated.

I claim:
1. A compound corresponding to the formula

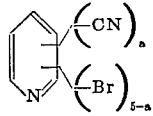

wherein $a$ is an integer having a value of 1 or 2.

2. The compound of claim 1 wherein the compound is 2-cyano-3,4,5,6-tetrabromopyridine.
3. The compound of claim 1 wherein the compound is 3-cyano-2,4,5,6-tetrabromopyridine.
4. The compound of claim 1 wherein the compound is 4-cyano-2,3,5,6-tetrabromopyridine.
5. The compound of claim 1 wherein the compound is 2,6-dicyano-3,4,5-tribromopyridine.
6. A process which consists of heating a mixture of monocyanopyridine or dicyanopyridine vapor and excess bromine vapor at a temperature of from about 550° to 675° C.
7. The process of claim 6 wherein the mixture is prepared by heating a dispersion of cyanopyridine in liquid bromine.
8. The process of claim 6 wherein the cyanopyridine is 2-cyanopyridine.
9. The process of claim 6 wherein the cyanopyridine is 3-cyanopyridine.
10. The process of claim 6 wherein the cyanopyridine is 4-cyanopyridine.
11. The process of claim 6 wherein the cyanopyridine is 2,6-dicyanopyridine.

References Cited
UNITED STATES PATENTS
3,325,503   6/1967   Bimber _____ 260—294.9

ALAN L. ROTMAN, Primary Examiner

U.S. Cl. X.R.
424—263